(12) United States Patent
Singh et al.

(10) Patent No.: US 10,904,030 B2
(45) Date of Patent: Jan. 26, 2021

(54) BUILDING MANAGEMENT SYSTEM WITH BACNET BROADCAST MANAGEMENT (BBMD) DEVICE

(71) Applicant: Johnson Controls Technology Company, Auburn Hills, NJ (US)

(72) Inventors: Japneet Singh, New Delhi (IN); Ishmeet Bhatia, Faridabad (IN); Manu Garg, Gurgaon (IN); Vikas Sharma, New Delhi (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 29 days.

(21) Appl. No.: 16/366,020

(22) Filed: Mar. 27, 2019

(65) Prior Publication Data
US 2020/0313925 A1    Oct. 1, 2020

(51) Int. Cl.
| | | |
|---|---|---|
| *G06F 15/177* | (2006.01) | |
| *H04L 12/28* | (2006.01) | |
| *H04L 12/24* | (2006.01) | |
| *H04L 12/403* | (2006.01) | |

(52) U.S. Cl.
CPC ........ *H04L 12/2838* (2013.01); *H04L 12/403* (2013.01); *H04L 41/0668* (2013.01)

(58) Field of Classification Search
CPC ............... H04L 12/403; H04L 12/2838; H04L 41/0668

USPC ................................................. 709/203, 221
See application file for complete search history.

(56) References Cited

U.S. PATENT DOCUMENTS

| | | | |
|---|---|---|---|
| 8,174,962 B2 | 5/2012 | Ramanathan et al. | |
| 2009/0267431 A1* | 10/2009 | Tallam | H03H 7/427 |
| | | | 310/71 |
| 2016/0210209 A1* | 7/2016 | Verkaik | G06F 11/2033 |
| 2018/0191723 A1* | 7/2018 | Washbrook | H04L 67/1097 |
| 2019/0109907 A1* | 4/2019 | Duraisingh | H04L 41/12 |

* cited by examiner

*Primary Examiner* — Frantz B Jean
(74) *Attorney, Agent, or Firm* — Foley & Lardner LLP

(57) ABSTRACT

A building automation system includes a plurality of subnets, an active broadcast management device configured on at least one of the subnets, a pool of virtual devices communicably connected to the active broadcast management device, each of the virtual devices in the pool of virtual devices configured to store a broadcast distribution table (BDT), one or more processors, and memory coupled to the one or more processors and storing instructions. When executed by the one or more processors, the instructions cause the one or more processors to transmit a health status message to each available virtual device in the pool of virtual devices, receive a health status response from each of the available virtual devices, and select, according to the health status responses, at least one of the virtual devices from among the available virtual devices as a backup virtual broadcast management device to the active broadcast management device.

20 Claims, 9 Drawing Sheets

BUILDING MANAGEMENT SYSTEM WITH BACNET BROADCAST MANAGEMENT (BBMD) DEVICE

BACKGROUND

The present disclosure relates generally to building management systems or building automation systems (BAS). The present disclosure relates more particularly to building automation systems having broadcast management devices with improved reliability. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

Broadcast management devices are used in a BAS to distribute broadcast messages throughout a network formed of interconnected sub-networks (or subnets). Such broadcast management devices include, for example, a BACnet Broadcasting Management Device (BBMD), which relays BACnet (e.g., Building Automation and Control Network) messages from devices (e.g., building equipment) connected to its subnet over a BACnet/IP network to other BBMD devices connected to the network. The other BBMD devices re-broadcast the received BACnet message to the devices connected to their corresponding subnets. In this way, devices belonging to one subnet may communicate with devices belonging to another subnet through their respective BBMDs. Accordingly, when a BBMD fails, the devices connected thereto cannot communicate with devices connected to other subnets, which can lead to undesired consequences (e.g., unplanned downtime) on a customer's BAS system.

The above information disclosed in this Background section is for enhancement of understanding of the background of the invention, and therefore, it may contain information that does not constitute prior art.

SUMMARY

According to an example embodiment, a building automation system includes: a plurality of subnets; an active broadcast management device configured on at least one of the plurality of subnets; a pool of virtual devices communicably connected to the active broadcast management device, each of the virtual devices in the pool of virtual devices configured to store a broadcast distribution table (BDT); one or more processors; and memory coupled to the one or more processors and storing instructions that, when executed by the one or more processors, cause the one or more processors to: transmit a health status message to each available virtual device in the pool of virtual devices; receive a health status response from each of the available virtual devices; and select, according to the health status responses, at least one of the virtual devices from among the available virtual devices as a backup virtual broadcast management device to the active broadcast management device.

In some embodiments, the backup virtual broadcast management device may be configured to sync BDT data with the active broadcast management device.

In some embodiments, the backup virtual broadcast management device may be configured to detect failure of the active broadcast management device, and to switch over to an address of the active broadcast management device to assume an active role for the active broadcast management device in response to detecting the failure.

In some embodiments, the health status message may be transmitted to each of the available virtual devices in response to failure of the active broadcast management device.

In some embodiments, the health status response may include health data from each of the available virtual devices, the health data including memory state, processor status, number of processes running, and network status.

In some embodiments, the health data may be weighted according to site configuration requirements of the building automation system.

In some embodiments, the weighted health data for each of the available virtual devices may be compared to each other to select the backup virtual broadcast management device.

In some embodiments, the backup virtual broadcast management device may be configured to periodically inject network data into at least one of the plurality of subnets to detect a network status of the plurality of subnets.

In some embodiments, the backup virtual broadcast management device may be configured to periodically read memory state and processor status of the active broadcast management device, and to store historical values of the memory state and processor status of the active broadcast management device.

In some embodiments, the backup virtual broadcast management device may be configured to compare recent values of the memory state and the processor status of the active broadcast management device with the stored historical values to identify a potential fault state of the active broadcast management device.

According to another example embodiment, a method for improving communication reliability between devices in a building automation system including a plurality of subnets, an active broadcast management device configured on at least one of the plurality of subnets, and a pool of virtual devices communicably connected to the active broadcast management device, each of the virtual devices in the pool of virtual devices configured to store a broadcast distribution table (BDT) is provided. The method includes: transmitting, by one or more processors, a health status message to each available virtual device in the pool of virtual devices; receiving, by the one or more processors, a health status response from each of the available virtual devices; and selecting, by the one or more processors, at least one of the virtual devices from among the available virtual devices according to the health status responses, the at least one of the virtual device selected to serve as a backup virtual broadcast management device to the active broadcast management device.

In some embodiments, the backup virtual broadcast management device may be configured to sync BDT data with the active broadcast management device.

In some embodiments, the backup virtual broadcast management device may be configured to detect failure of the active broadcast management device, and to switch over to an address of the active broadcast management device to assume an active role for the active broadcast management device in response to detecting the failure.

In some embodiments, the health status message may be transmitted to each of the available virtual devices in response to failure of the active broadcast management device.

In some embodiments, the health status response may include health data from each of the available virtual devices, the health data including memory state, processor status, number of processes running, and network status.

In some embodiments, the method may further include weighing, by the one or more processors, the health data according to site configuration requirements of the building automation system.

In some embodiments, the method may further include comparing, by the one or more processors, the weighted health data for each of the available virtual devices to each other to select the backup virtual broadcast management device.

In some embodiments, the backup virtual broadcast management device may be configured to periodically inject network data into at least one of the plurality of subnets to detect a network status of the plurality of subnets.

In some embodiments, the backup virtual broadcast management device may be configured to periodically read memory state and processor status of the active broadcast management device, and to store historical values of the memory state and processor status of the active broadcast management device.

In some embodiments, the backup virtual broadcast management device may be configured to compare recent values of the memory state and the processor status of the active broadcast management device with the stored historical values to identify a potential fault state of the active broadcast management device.

DETAILED DESCRIPTION

Overview

Figure 1:
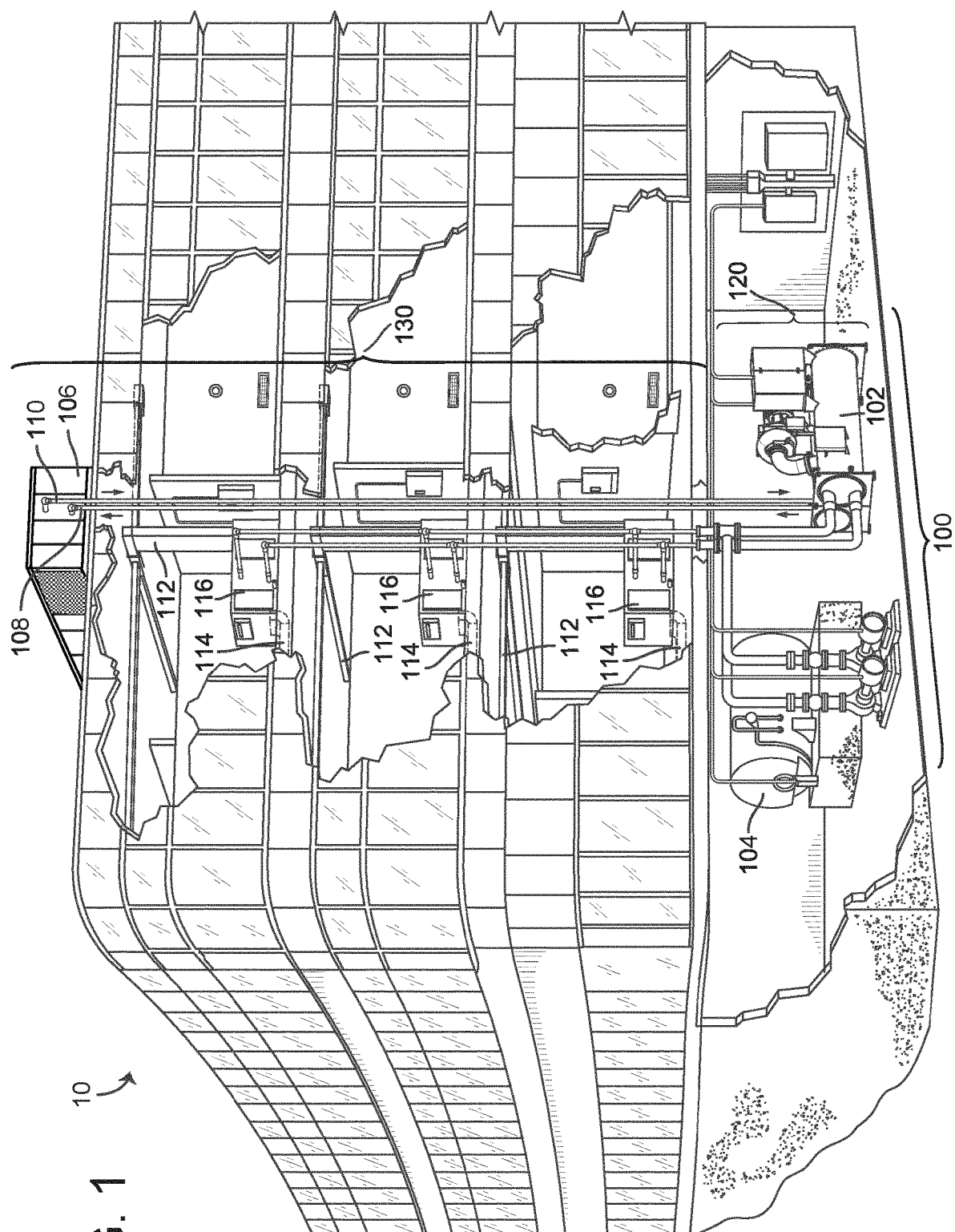
FIG. 1 is a drawing of a building equipped with a HVAC system, according to an exemplary embodiment.

Referring generally to the FIGURES, the systems and methods discussed herein relate to broadcast management devices for managing communications between devices (e.g., building equipment) in a BAS, according to various exemplary embodiments. While an example of a broadcast management device is described as a BBMD, the present disclosure is not limited thereto, and other suitable broadcast management devices are contemplated. For example, in some embodiments, a broadcast management device may be another suitable BACnet device having other BACnet functionality that is reconfigured as a broadcast management device to transmit broadcasts between different IP subnets. In various embodiments, each BBMD in a BAS may have one or more associated digital twins (or virtual twins) that are redundant copies of the actual BBMD device. Thus, in case of a failure of the actual BBMD device, the digital twin may assume an active role for the failed BBMD device.

For example, in some embodiments, a digital twin of a BBMD device may be a software application running on a machine or virtual device (e.g., a virtual machine) having a processor (e.g., CPU) and memory (e.g., RAM) that replicates the BBMD device (or a portion of the BBMD device). In some embodiments, the digital twin can be an evolving digital profile of the historical and current behavior of the BBMD device that helps optimize network performance. The digital twin can be based on herculean, cumulative, and real-time data measurements across an assemblage of dimensions. These measurements may be responsible for creating the evolving profile of the BBMD device and provide users (e.g., system administrators) with important insights into network performance. In some embodiments, the digital twin of the BBMD device can be selected and maintained based on the operation of the BBMD device. For example, the digital twin may rely on data gathered from the BBMD device to facilitate an understanding of the current status of the health of the BBMD device and the current status of the network. In some embodiments, the digital twin can learn from the data collected over time, and can provide various operational recommendations for the BBMD device. These recommendations may be used for improvements to the operation or reliability of the network by reducing or minimizing downtime attributed to failures or potential faults of the BBMD device.

In some embodiments, the digital twins of the BBMD devices as described herein can facilitate remote configuration and maintenance of the BBMD devices. For example, a user or technician could make one or more changes to the digital twin which could be then be implemented as physical operational changes to the BBMD device. This can save money by reducing service charges which may be required for a technician to be physically present at a building site to make changes to the BBMD device. Furthermore, the digital twin can be used for auto provisioning of the BBMD devices. For example, if a BBMD device comes back online, or another BBMD device is installed, the digital twin can send configuration information to the BBMD device to update its own configuration data (e.g., BDT, FDT, IP address, and/or the like).

Furthermore, in some embodiments, the digital twin can provide continuous (or periodic) monitoring of the health of the BBMD device. For example, in some embodiments, the digital twin can be periodically (or continually) updated based on RAM state and CPU status readings collected from the BBMD device. Based on the digital twin, potential BBMD device failures can be predicted and maintenance can be recommended for the BBMD device before a failure occurs (or soon thereafter). This can improve the total life time of the BBMD device. Furthermore, various parameters and settings of the BBMD device can continually be tuned based on the digital twin. This can result in reducing or minimizing downtime of the BBMD device.

Building Automation and HVAC System

Referring now to FIGS. 1-4, an exemplary building automation system (BAS) and HVAC system in which the systems and methods of the present invention can be implemented are shown, according to an exemplary embodiment.

Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
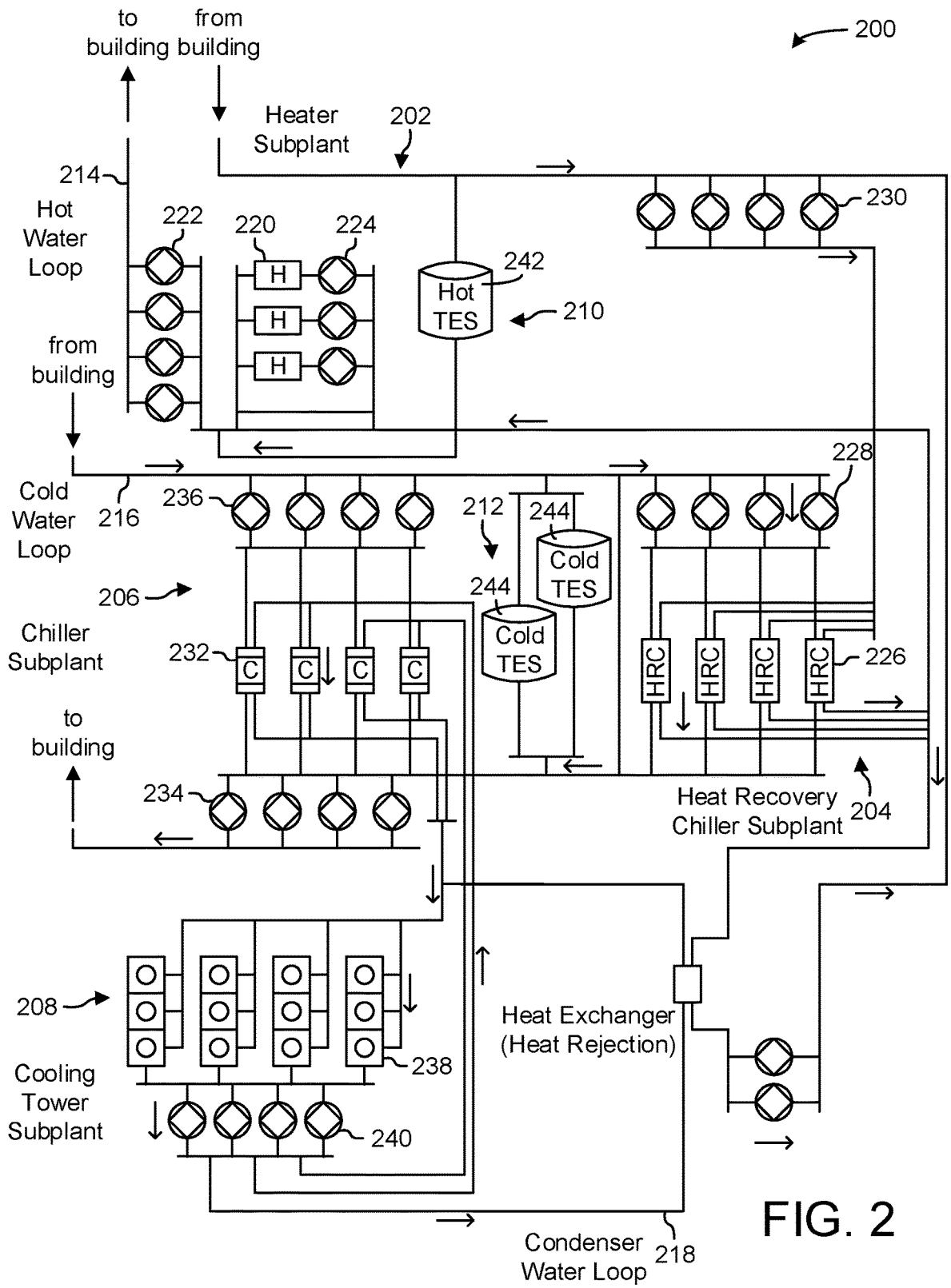
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
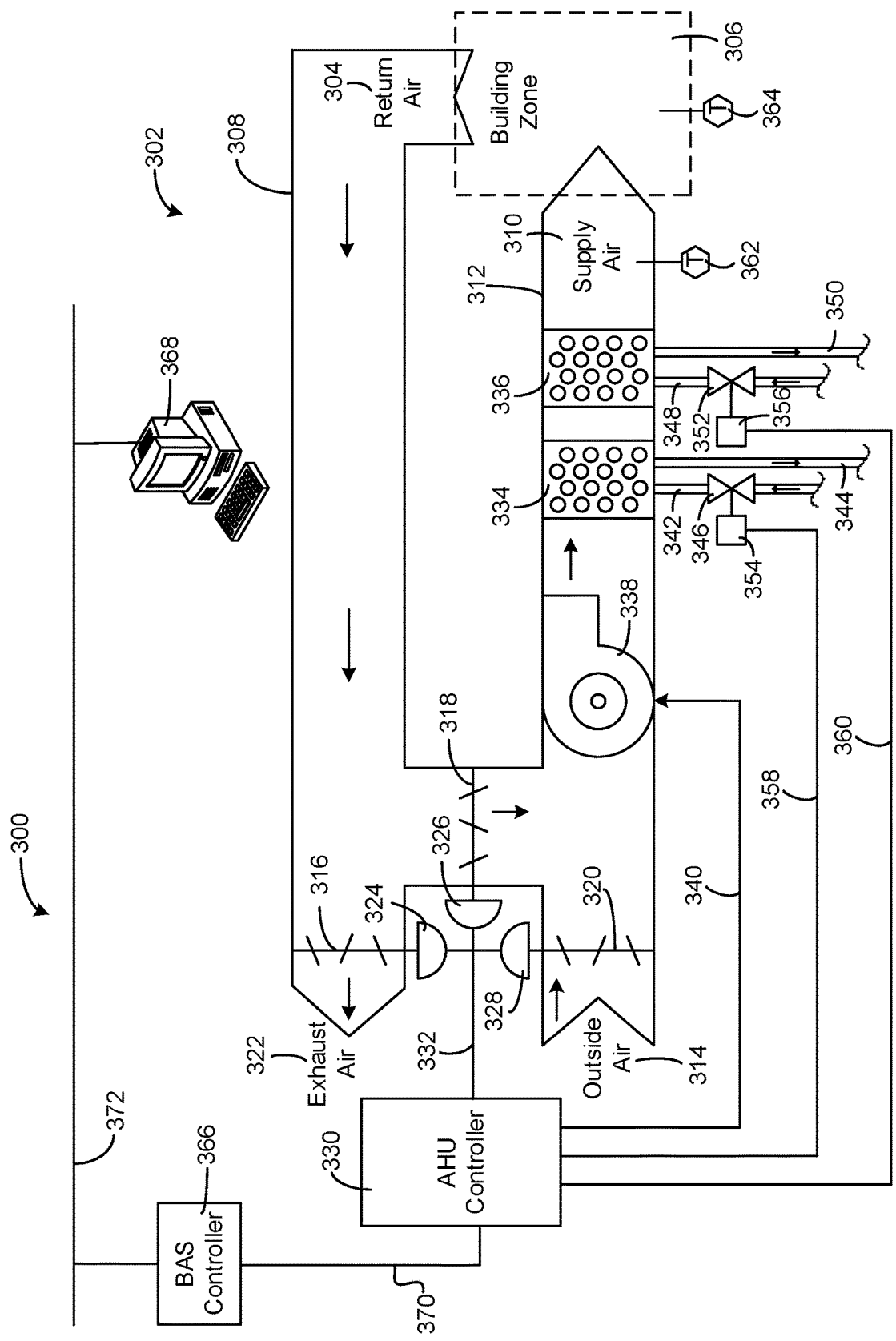
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
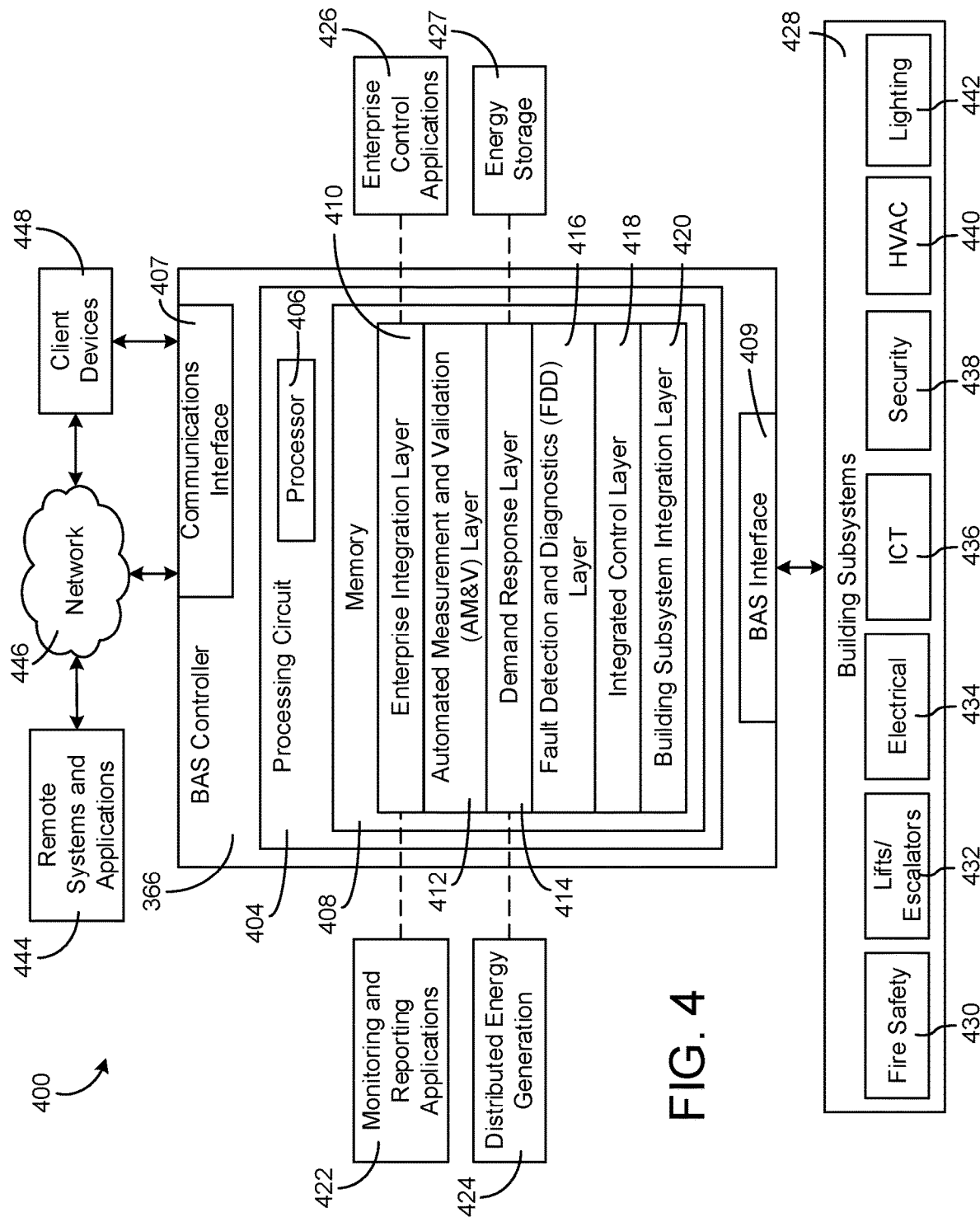
FIG. 4 is a block diagram of a building automation system (BAS) that may be used to monitor and/or control the building of FIG. 1, according to an exemplary embodiment.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Although some embodiments in the specification are described primarily with reference to HVAC equipment, it should be understood that the systems and methods described herein can be applicable to a wide variety of building equipment and/or other types of connected devices (e.g., HVAC equipment, LED lights, lighting systems mobile phones, elevator systems, fire safety systems, security systems, smart street lamps, cars, televisions, etc.) with embedded intelligence and communication capabilities.

BAS Network with BBMD Devices

Figure 5:
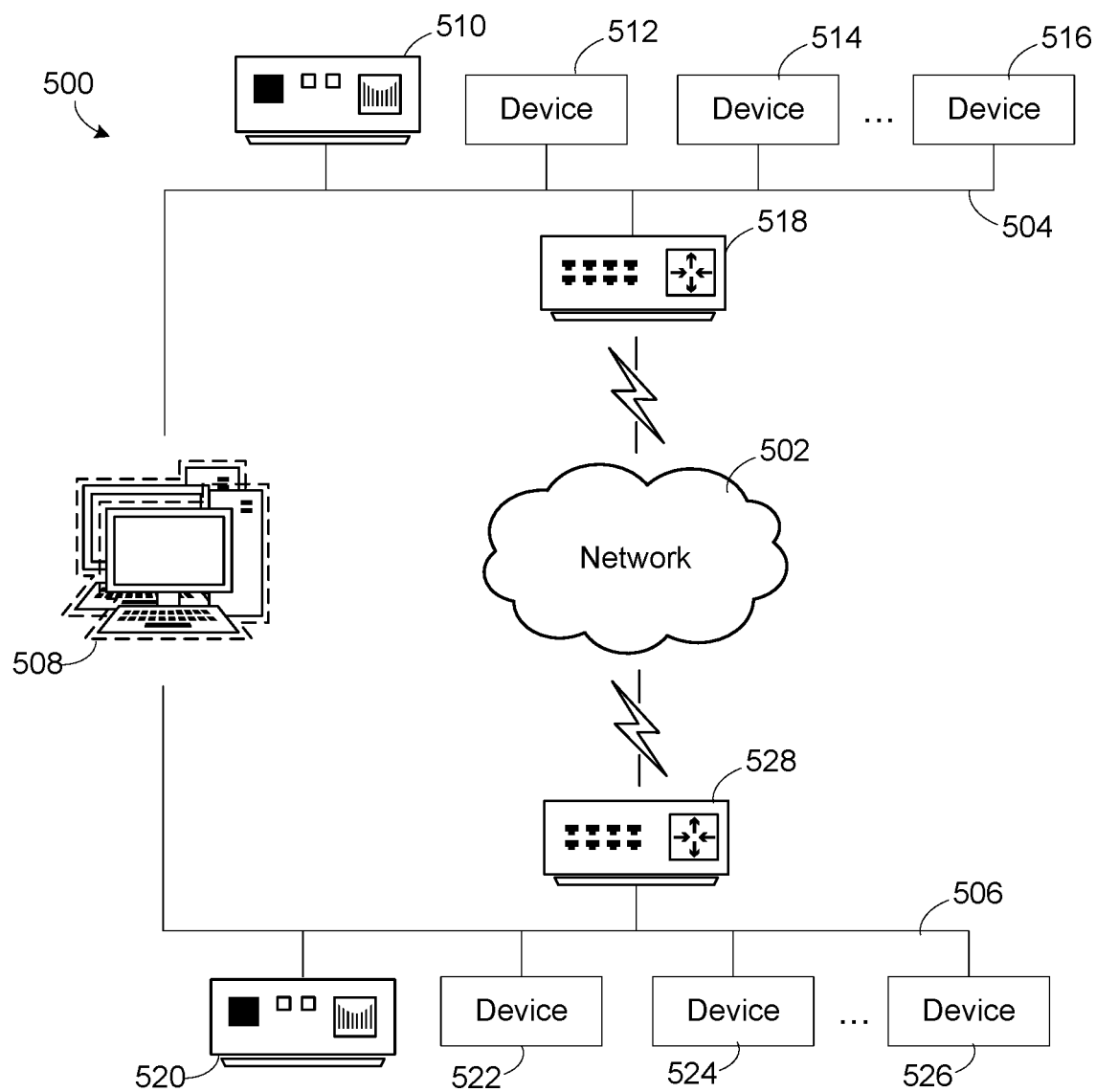
FIG. 5 is a block diagram of a building automation system network, according to an exemplary embodiment.

Referring now to FIG. 5, a building automation system network is shown, according to an exemplary embodiment. In some embodiments, the BAS network 500 may include a BACnet/IP network including a first subnet 504 and a second subnet 506 that are communicatively coupled to a data communications network 502. In various embodiments, the data communications network 502 may be the Internet or any suitable data communications network, such as a local area network (LAN), a wide area network (WAN), a cellular network, a satellite network, a radio network, or any other type of communication or data network or combination thereof. The first subnet 504 includes a first BBMD device 510 and a plurality of devices 512, 514, and 516 (e.g., building equipment, sensors, and/or the like) configured to communicate over the first subnet 504. The second subnet 506 includes a second BBMD device 520 and a plurality of devices 522, 524, and 526 (e.g., building equipment, sensors, and/or the like) configured to communicate over the second subnet 506. In some embodiments, each of the devices 512, 514, 516, 522, 524, and 526 may be BACnet/IP devices, but the present disclosure is not limited thereto, and in other embodiments, each of the devices 512, 514, 516, 522, 524, and 526 may be any suitable IP based device or building controller that is enabled to communicate with the BAS network 500 over any suitable protocol.

As shown in FIG. 5, in some embodiments, each subnet 504 and 506 may be configured with a corresponding router 518 and 528 to route directed (e.g., unicast) messages from their corresponding subnet 504 or 506 to other devices (e.g., other devices in other subnets). In some embodiments, to discover devices on the BAS network 500, a device (e.g., 512, 514, 516, 522, 524, or 526) broadcasts a Who-Is message and the other devices (e.g., 512, 514, 516, 522, 524, and 526) respond with an I-Am message that carries networking information to allow the device to read/write on the other devices. However, in some embodiments, when a router is configured on the subnet, the router may block broadcast messages while allowing directed (e.g., unicast) messages from the subnet. For example, when a device 512 broadcasts a Who-Is message over the subnet 504, the other devices (e.g., 510, 514, and 516) on the subnet 504 may receive the broadcast message, but the router 518 blocks the broadcast message from reaching the devices (e.g., 520, 522, 524, and 526) on the other subnet 506. In this case, the BBMD device 510 encapsulates or packages the broadcast messages received on the subnet 504 and sends the encapsulated messages as directed messages to other BBMD devices (e.g., BBMD 520) in its Broadcast Distribution Table (BDT). In some embodiments, at least one of the BBMD devices 510 and 520 may support foreign device registration, in which the BBMD device will also send encapsulated broadcast messages as directed messages to the foreign devices registered in its Foreign Device Table (FDT). Accordingly, when a BBMD device (e.g., 510 or 520) malfunctions or fails, the devices configured to broadcast messages on its corresponding subnet (e.g., 504 or 506) may be restricted (or prevented) from communicating with the devices configured on other subnets, which can lead to undesired downtime and/or data loss.

According to various embodiments, each of the BBMD devices 510 and 520 are connected to a pool (e.g., one or more) of digital twins 508 as backups for the BBMD devices 510 and 520 in case of a failure of one or more of the BBMD devices 510 and 520. In various embodiments, each of the BBMD devices 510 and 520 may share the same pool of digital twins 508 or may have its own dedicated pool (e.g., one or more) of digital twins 508. In various embodiments, the pool of digital twins 508 may be connected locally (e.g., via a local wired or wireless connection) to each of the subnets 504 and 506, or may be connected remotely (e.g., via the Internet) with different IP entries present for each subnet having a BBMD device. In some embodiments, each of the digital twins in the pool of digital twins 508 may be a software application on a computing machine or virtual device (e.g., a virtual machine) having a processor (e.g., CPU) and memory (e.g., RAM), or may be hosted on a cloud computing platform including one or more controllers, servers, and/or any other computing device that can be located remotely and/or connected to the BBMD devices 510 and 520 via network 502. For example, in some embodiments, the cloud computing platform can be one or a combination of MICROSOFT AZURE, AMAZON WEB SERVICES (AWS), a private computing cloud, and/or a public computing cloud.

According to some embodiments, each of the BBMD devices 510 and 520 may have one or more digital twins (e.g., virtual devices) assigned to it from among the pool of digital twins 508. In some embodiments, the assigned digital twin(s) are a backup or passive BBMD for a corresponding subnet 504 and 506. For example, in some embodiments, if the BBMD device (e.g., 510 or 520) for the subnet (e.g., 504 or 506) fails or malfunctions, the corresponding digital twin assumes an active role of the BBMD for that subnet. Accordingly, in some embodiments, the corresponding digital twin is a virtual replica of the BBMD device (or a portion of the BBMD), and has the same BDT data (and FDT data, if applicable) and configuration information (e.g., IP address) of the BBMD device. In some embodiments, a digital twin for a corresponding subnet 504 or 506 may appear as a BACnet/IP device on the corresponding subnet when acting as a passive BBMD device that is configured with a different IP address from that of the BBMD device, and may be configured to switch-over to the IP address of the BBMD device when a failure or potential fault of the BBMD device is detected. In some embodiments, the digital twins 508 include data analytics and fault diagnostic and prevention capabilities that utilize active and knowledge based fault detection methodologies to proactively predict potential failure states or fault occurrences of the BBMD devices. Thus, in various embodiments, if a BBMD device for a corresponding subnet fails or a potential fault or failure is predicted, the digital twin can be proactively assigned to the role of the active BBMD for the corresponding subnet by simply switching over the IP of the corresponding digital twin to the IP of the BBMD device. Accordingly, impact to the BAS from an unexpected outage of the BBMD device may be reduced or minimized.

Figure 6:
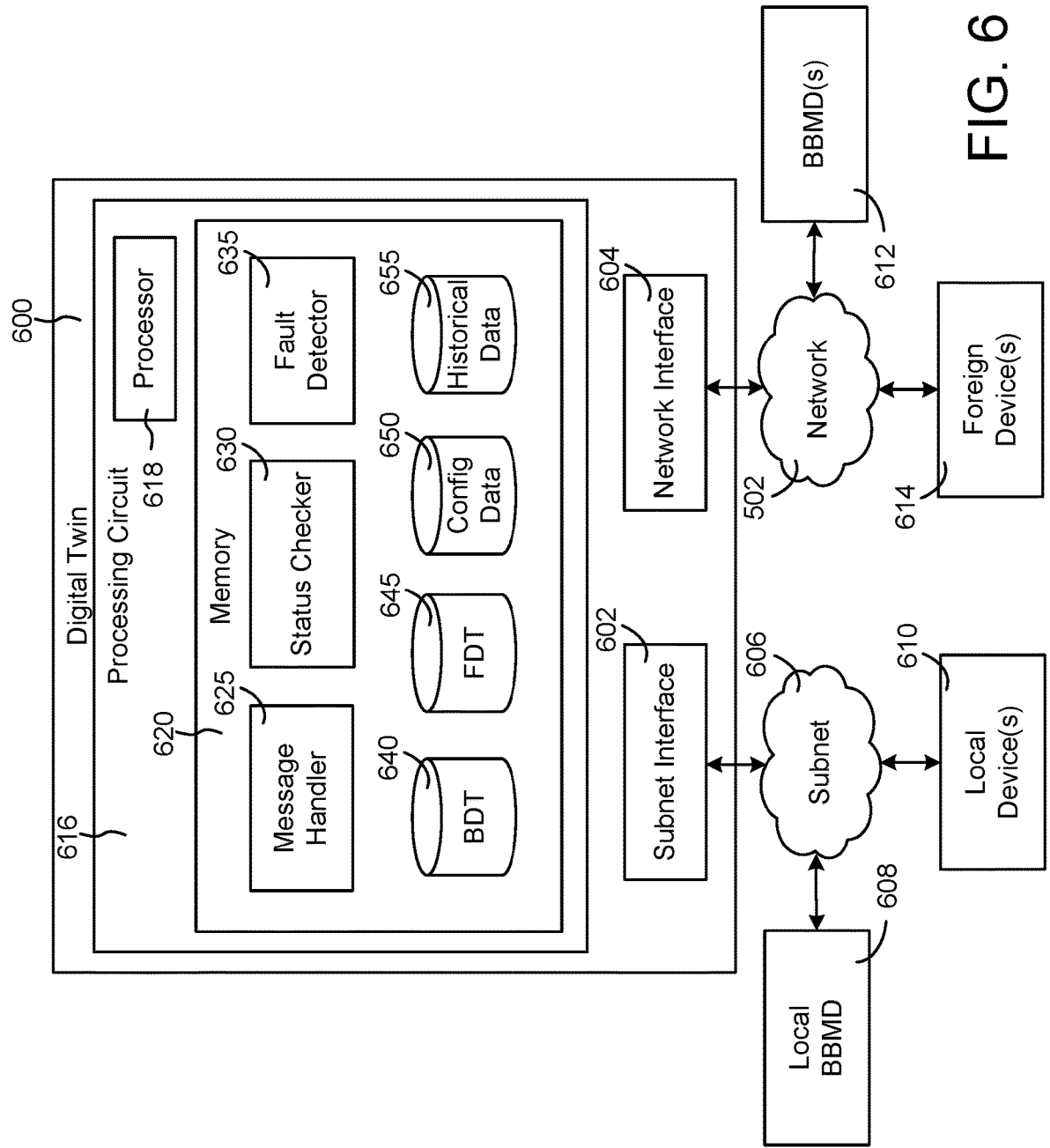
FIG. 6 is a block diagram of an example of a digital twin for a BBMD device, according to an exemplary embodiment.

For example, referring to FIG. 6, a block diagram illustrating an example of a digital twin for a BBMD device is shown in greater detail, according to some embodiments. In some embodiments, the digital twin 600 is selected and assigned as a backup or passive BBMD for a local BBMD device 608 that is connected to a local subnet 606. The selection process of the digital twin 600 will be described in more detail with reference to FIG. 7. In some embodiments, the digital twin 600 is configured to diagnose faults, identify network related issues, predict potential failure states, and generate pre-emptive notifications when an issue or potential issue with the local BBMD device 608 is detected or identified. Thus, in the event of a malfunction or potential failure of the local BBMD device 608, the digital twin 600 can proactively take its place as an active virtual BBMD for the subnet 606. In some embodiments, the digital twin 600 may provide a virtual testing environment that is a replica of the local BBMD device 608 (or a portion of the local BBMD device 608), so that upgrades and patches (e.g., operating system updates, security patches, and/or the like) can first be applied and tested on the digital twin 600 before being applied to the actual local BBMD device 608. Thus, potential effects of the upgrades or patches on one or more functionalities or features of the local BBMD device 608 can first be tested and monitored for stability on the digital twin 600, before going live on the local BBMD device 608. Accordingly, in various embodiments, undesired downtime of a BAS due to issues or potential issues with the BBMD devices may be reduced or prevented.

In more detail, in various embodiments, the digital twin 600 includes a subnet interface 602 and a network interface 604. In some embodiments, the subnet interface 602 and the network interface 604 can be a part of the same interface, or may be separate interfaces. In some embodiments, the subnet interface 602 and the network interface 604 can include wired or wireless communications interfaces (e.g., jacks, antennas, transmitters, receivers, transceivers, wire terminals, etc.) for conducting data communications with other devices within the BAS network 500. In some embodiments, communications conducted via interfaces 602 and 604 can be direct (e.g., local wired or wireless communications), or via a data communication network (e.g., a WAN, the Internet, a cellular network, etc.).

In some embodiments, the subnet interface 602 facilitates communications between the digital twin 600 and the local devices configured for communications on the subnet 606. For example, in some embodiments, the subnet interface 602 facilitates communications between the digital twin 600 and the local BBMD device 608, as well as between the digital twin 600 and one or more local devices 610 configured to communicate on the subnet 606. In some embodiments, the digital twin 600 receives BDT data, FDT data, configuration data (e.g., IP address), and/or the like from the local BBMD device 608, and provides control signals to the local BBMD device 608, via the subnet interface 602. For example, the digital twin 600 may receive updates or changes to the BDT, FDT, or IP address of the local BBMD device 608, and may read the CPU state, available memory, thread count, throughput, response time, up time, and/or the like of the local BBMD device 608, via the subnet interface 602. In some embodiments, the digital twin 600 may be configured to listen for (or receive) broadcast messages from the local devices 610 via the subnet interface 602. Likewise, in some embodiments, the digital twin 600 may re-broadcast directed messages received from other devices (e.g., other BBMD devices, FDT devices, and/or the like) to the local devices 610 via the subnet interface 602, when acting as the active BBMD.

In some embodiments, the network interface 604 facilitates communications between the digital twin 600 and other devices configured for communications via the network 502. For example, in some embodiments, the network interface 604 facilitates communications between the digital twin 600 and one or more other BBMD devices 612 configured on other subnets, as well as between the digital twin 600 and one or more foreign devices 614 registered in the FDT of the local BBMD device 608, via the network 502. In some embodiments, the digital twin 600 receives directed messages (e.g., unicast messages) from the one or more other BBMD devices 612, and transmits directed messages to the one or more other BBMD devices 612, via the network interface 604. Likewise, in some embodiments, the digital twin 600 receives directed messages from one or more foreign devices 614, and transmits directed messages to the one or more foreign devices 614, via the network interface 604.

In some embodiments, the digital twin 600 includes one or more processing circuits 616 including one or more processors 618 and memory 620. Each of the processors 618 can be a general purpose or specific purpose processor, an application specific integrated circuit (ASIC), one or more field programmable gate arrays (FPGAs), a group of processing components, or other suitable processing components. Each of the processors 618 can be integrated within a single device or distributed across multiple separate systems or devices. For example, each of the processors 618 may be an internal processor with respect to the digital twin 600 or may be an external processor implemented as part of a cloud-based computing system. Each of the processors 618 is configured to execute computer code or instructions stored in memory 620 or received from other computer readable media (e.g., CDROM, network storage, a remote server, etc.).

Memory 620 can include one or more devices (e.g., memory units, memory devices, storage devices, etc.) for storing data and/or computer code for performing and/or facilitating the various processes described in the present disclosure. Memory 620 can include random access memory (RAM), read-only memory (ROM), hard drive storage, temporary storage, non-volatile memory, flash memory, optical memory, or any other suitable memory for storing software objects and/or computer instructions. Memory 620 can include database components, object code components, script components, or any other type of information structure for supporting the various activities and information structures described in the present disclosure. Memory 620 can be communicably connected to the processors 618 via the processing circuits 616 and can include computer code for executing (e.g., by processor 618) one or more processes described herein.

In some embodiments, memory 620 includes a message handler 625, a status checker 630, a fault detector 635, a BDT storage container 640 for storing BDT data, a FDT storage container 645 for storing FDT data (e.g., if applicable), a configuration data storage container 650 for storing configuration data (e.g., IP address of the local BBMD device 608), and a historical data storage container 655 for storing historical operational data associated with the local BBMD device 608 and/or the larger network (e.g., the BAS network 500). While the BDT storage container 640, the FDT storage container 645, the configuration data storage container 650, and the historical data storage container 655 are shown in FIG. 6 as being part of the memory 620, the present disclosure is not limited thereto, and in various embodiments, each of these storage containers may be internal storage or external storage. For example, each of these storage containers may be internal storage with relation to the digital twin 600 (or the virtual machine associated therewith), and/or may include a remote database, cloud-based data hosting, or other remote data storage. In some embodiments, each of these storage containers may be a separate storage device (e.g., a database, look-up table, and/or the like), or at least some of these storage containers may be a logical component of the same storage device.

Still referring to FIG. 6, in various embodiments, the message handler 625 can be configured to facilitate communication between the digital twin 600 and the other devices (e.g., BBMDs 608 and 612, devices 610, foreign devices 614, and/or the like) on the subnet 606 and/or the network 502. For example, the message handler 625 can be configured to send and/or receive broadcast messages over the subnet 606, and to send and/or receive directed messages over the network 502. In some embodiments, the message handler 625 encapsulates broadcast messages received from the subnet 606 into directed messages, and sends the directed messages to other devices (e.g., BBMD devices 612, foreign devices 614, and/or the like) registered in the BDT and/or FDT over the network 502. Likewise, in some embodiments, the message handler 625 receives directed messages over the network 502 and broadcasts the directed messages over the subnet 606. In various embodiments, the message handler 625 may communicate with the local BBMD device 608 to maintain the BDT data and FDT data (if applicable) of the digital twin 600 (e.g., stored in the BDT storage container 650 and the FDT storage container 645) in sync with the BDT data and FDT data of the local BBMD device 608.

In various embodiments, the status checker 630 periodically checks the health status of the BBMD device 608 and/or the network status of one or more subnets 606 (or the network 502). For example, in some embodiments, the status checker 630 sends health status messages (e.g., via message handler 624 or via subnet interface 602) to the local BBMD device 608 to read health data (e.g., CPU status or processor status and RAM state or memory state) of the local BBMD device 608. For example, in some embodiments, the status checker 630 periodically reads the health data of the local BBMD device 608, and stores historical values of the health data (e.g., the processor status and memory state) in the historical data storage container 655. In some embodiments, the status checker 630 periodically reads the event log of the local BBMD device 608, and tracks updates or upgrades to the operating system or software of the local BBMD device to track changes in performance since the upgrades or updates. For example, in some embodiments, the received health data may include the data shown in the non-limiting example of Table 1:

| BBMD IP | CPU State | RAM State | Last Error Log | Last Update |
|---|---|---|---|---|
| 10.108. 171.X | 95% | 1 Gb | Windows error at 10:30 AM | 18 Jan, 4:30 PM |

Likewise, in some embodiments, the status checker 630 injects network status messages (e.g., via message handler 624 or via subnet interface 602) into the network (e.g., subnet 606 and/or network 502) to gather network data. For example, in some embodiments, the status checker 630 may periodically inject test data packets into the network (e.g., subnet 606 and/or network 502), and may track network behavior in response to the test data packets. In some embodiments, the status checker 630 may generate a vulnerability score for a particular subnet (or network) corresponding to a likelihood that the particular subnet (or network) will fail based on current network characteristics, for example, such as response time, expected response time, number of historical failures, network characteristics prior to the failures, and/or the like. In some embodiments, the status checker 630 may store historical values of the network data (e.g., response time, vulnerability score, and/or the like) in the historical data storage container 655. For example, in some embodiments, the received network data may include the data shown in the non-limiting example of Table 2:

| Subnet Identifier | Device Identifier | Response Time | Expected Response Time | Vulnerability Score |
|---|---|---|---|---|
| 10.108.171.89 | 510893 | 4.5 | 3.4 | 3 |
| 10.108.181.99 | 567234 | 2.4 | 3.9 | 1 |

In some embodiments, the fault detector 635 may analyze the data gathered by the status checker 630 to identify failures or potential fault states of the local BBMD 608 and the network. For example, in some embodiments, the fault detector 635 may compare recent health data of the local BBMD device 608 with historical health data, and may compare recent network data with historical network data to identify abnormal behavior of the local BBMD device 608 and/or the network. In some embodiments, the fault detector 635 may generate alarms when abnormal behavior is detected, and may generate notifications to notify an operator (e.g., a system administrator) of a failure or potential fault state of the local BBMD 608 and/or the network. In some embodiments, in response to detecting the failure or potential fault state, the digital twin 600 may assume an active role for the local BBMD device 608 by switching over its IP address to the IP address of the local BBMD device 608. In some embodiments, the switch over may occur automatically (e.g., without human intervention), or upon receiving a command from the operator (e.g., a system administrator) to switch over for the active role.

In a non-limiting example, assuming that the local BBMD device 608 communicates with two subnets or networks, Network 1 and Network 2, the status checker 630 may be configured to inject test data packets to each of Network 1 and Network 2 every 60 minutes (configurable), for example. When responses are received, the status checker 630 may store the network data gathered from the responses in the historical data storage container 655, and the fault detector 635 may compare the received responses with the historical data to identify any abnormal behavior. For example, assuming that the response time from Network 1 is 4 ms, and the fault detector 635 determines from the historical data that the average response time for Network 1 is 2 ms, the fault detector 635 may generate an alarm indicating the abnormal behavior so that the particular BAS site is monitored more closely. In this case, the fault detector 635 may configure the status checker 630 to send the test data packets every 15 minutes (as opposed to every 60 minutes) to monitor the network status more closely. If the response time of Network 1 falls back to 2 ms, the alarm may be dismissed. On the other hand, if the response time of Network 1 remains inconsistent for a configurable number of entries compared to the average response time, a probable fault flag may be raised, and a notification may be sent to the operator to inform the operator that the BBMD associated with Network 1 may be experiencing issues. In some embodiments, the duration of the test is configurable so that depending on network traffic between BBMDs, the parameters of the test (e.g., frequency of test data packets, number of inconsistent entries, and/or the like) can be increased or decreased. Accordingly, failure or potential faults may be detected earlier so that the BAS uptime may be increased.

Figure 7:
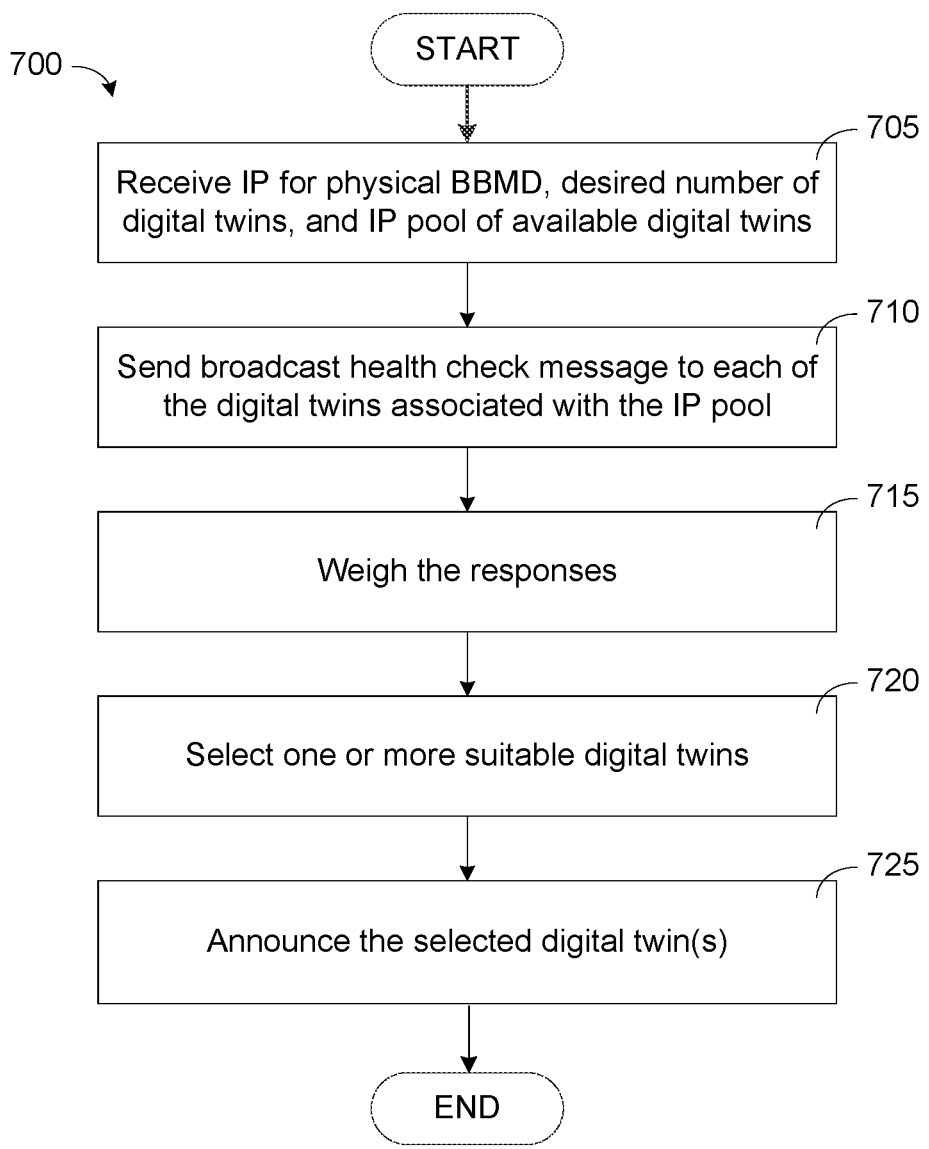
FIG. 7 is a flow diagram of a selection process for selecting a digital twin for a BBMD device, according to an exemplary embodiment.

FIG. 7 is a flow diagram of a selection process for selecting a digital twin for a BBMD device, according to some embodiments. In some embodiments, the selection process for selecting the digital twin for the BBMD device may be performed (or executed) when the BBMD device is initialized or configured. In other embodiments, the selection process may be performed (or executed) in response to detecting a failure or potential failure of the BBMD device. As discussed above, in some embodiments, each of the BBMD devices are connected to a pool of digital twins (e.g., one or more digital twins), and at least one of the digital twins from the pool of digital twins may be assigned to a corresponding BBMD device. For example, in some embodiments, a system administrator may utilize a BACnet configuration tool to select one or more digital twins from the pool of digital twins to serve as a backup to the BBMD device. In this case, the system administrator may set parameters for selecting the one or more digital twins, and the configuration tool may identify one or more candidates from the available digital twins that are suitable to serve as the backup or passive BBMD. In some embodiments, the configuration tool may display a list of the candidate digital twins so that the system administrator can select one or more of the candidate digital twins as the backup for the BBMD device. However, the present disclosure is not limited thereto, and in other embodiments, the identified one or more candidate digital twins may be automatically configured as the backup or passive BBMD.

In more detail, referring to FIG. 7, the selection process 700 starts and the parameters for the selection process is received at block 705. For example, in some embodiments, the parameters include the IP address for the BBMD device, the desired number of digital twins to serve as a backup or passive BBMD to the BBMD device, and the IP pool including the IP address of each available digital twin in the pool of digital twins. In some embodiments, the number of available digital twins in the pool of digital twins may be less than the entire number of digital twins in the pool of digital twins, but the present disclosure is not limited thereto, and in other embodiments, each of the digital twins in the pool of digital twins may be considered as an available digital twin. For example, in some embodiments, if a digital twin in the pool of digital twins is already assigned to serve as a backup or a passive BBMD for another BBMD device, that digital twin may be considered as being unavailable.

In some embodiments, a health status message is broadcast to each of the available digital twins in the pool of digital twins at block 710 to read health data of each of the digital twins. For example, in some embodiments, if a digital twin is overloaded or is experiencing issues or faults of its own, it should not be selected to serve as the backup or passive BBMD. In other words, the health status message is broadcast to each of the available digital twins to ensure that a healthy digital twin is selected as the backup or passive BBMD, so that the selected digital twin has enough memory to run desired operations, a CPU that is working at an optimum or desired level, and network latency that is within defined limits. Accordingly, in some embodiments, the health status message may be sent to each of the available digital twins identified in the IP pool, and each of the available digital twins may respond with a health status response including health data. In some embodiments, the health data may include memory state (e.g., RAM state), processor status (e.g., CPU status), number of running processes, network status (e.g., network latency), and/or the like. Accordingly, if any of the available digital twins are experiencing issues of their own, those digital twins can be removed or eliminated from further consideration as one of the candidate digital twins.

In some embodiments, the health data received from each of the available digital twins in response to the health status message may be weighted at block 715. In some embodiments, the health data is weighted based on site configuration requirements for the customer's BAS. For example, in some embodiments, stability of one BBMD (e.g., its RAM and CPU status) may be more important than network traffic for the one BBMD, while for another BBMD, network traffic may be more important than stability of the other BBMD. For example, in some embodiments, the health data may be weighed according to the below equation 1:

$$(W1 \times RAM + W1 \times CPU)^{Network\ Factor} \times \frac{W2}{Number\ of\ Processes}$$

where W1 and W2 are configurable weightage factors based on the configuration requirements for the customer's BAS (or for the particular BBMD device), and network factor corresponds to an amount of time it takes for a packet of data to go from one designated point to another. In some embodiments, network factor corresponds to the network latency, which may be measured by sending a packet of data that is returned to the sender, the round-trip time corresponding to the network latency.

In some embodiments, the weighted health data for each of the available digital twins is compared to each other, and one or more candidate digital twins are selected at block 720. In some embodiments, the remaining available digital twins (if any) may be sorted in order of suitability as a potential backup or alternative to the selected candidate digital twin(s). For example, in some embodiments, the remaining digital twins may be sorted according to its weightage value resulting from equation 1. In some embodiments, the selected candidate digital twin(s) is announced at block 725. For example, in some embodiments, the selected candidate digital twin(s) may be displayed to the operator via the configuration tool, and the IP address of the selected candidate digital twin(s) may be sent to the BBMD device for communication with the selected candidate digital twin(s), and the process may end. In some embodiments, a sorted list of the remaining digital twins may also be provided to the operator via the configuration tool as potential backups to the selected candidate digital twin(s), or for overriding the selection with one or more of the remaining digital twins.

Figure 8:
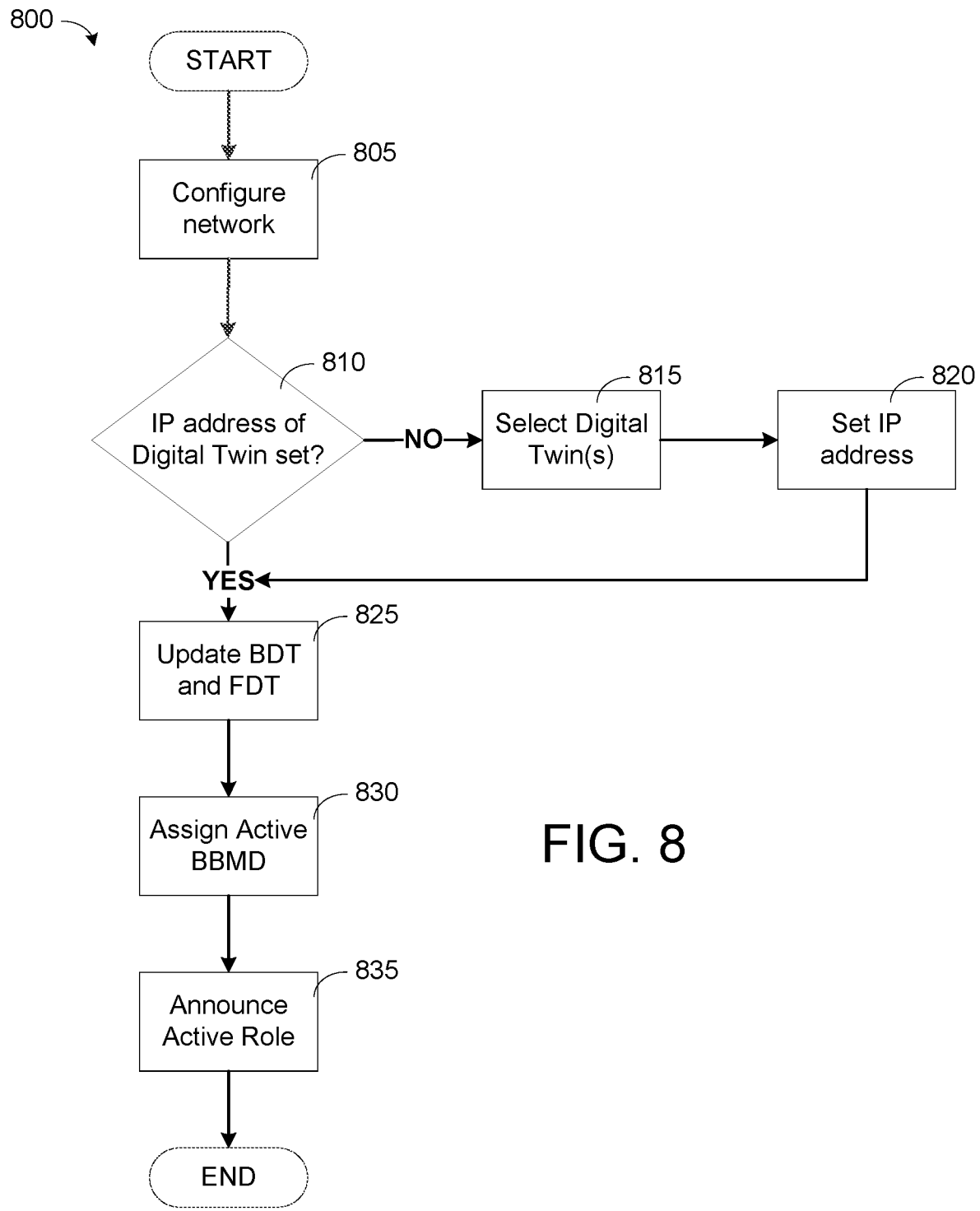
FIG. 8 is a flow diagram of an initialization process of a BBMD device, according to an exemplary embodiment.

FIG. 8 is a flow diagram of an initialization process of a BBMD device, according to some embodiments. In some embodiments, the initialization process of the BBMD device may occur when the BBMD device is initially configured, or when there is a restart of the network. Referring to FIG. 8, the process 800 starts and the network is configured at block 805. The configuration data of the BBMD device is checked to determine if an IP address of one or more digital twins are set at block 810. In another embodiment, the configuration data of the digital twins in the pool of digital twins may be checked to see if an IP address of the BBMD device is set at block 810. For example, in various embodiments, when a BBMD device has a digital twin assigned to it, the BBMD device stores the IP address of the digital twin so that the BBMD device can communicate with the digital twin. Similarly, when a digital twin is assigned to a BBMD device, the digital twin stores the IP address of the BBMD device so that the digital twin can switch-over in case of a failure or potential failure of the BBMD device. Accordingly, either the configuration data of the BBMD device or the configuration data of the digital twins may be checked at block 810 to determine if the IP address of the other is set. If not, then one or more digital twins are selected at block 815, and the IP address of the selected one or more digital twins are set at block 820. For example, in some embodiments, the one or more digital twins are selected according to the selection process described with reference to FIG. 7.

On the other hand, if the IP address is set at block 810, the BDT and FDT data of the BBMD device is updated at block 825 with the latest data. In some embodiments, the BBMD device communicates the updates to the BDT and FDT data to its corresponding digital twin, so that the digital twin can maintain synchronization of its BDT and FDT data with the BDT and FDT data of the BBMD device. The BBMD device is assigned to the active role at block 830, and the BBMD device announces that it has the active role at block 835. For example, in some embodiments, the BBMD device sends a message to each of the devices registered in its BDT and FDT that it has been assigned the active role, and the process ends.

Figure 9:
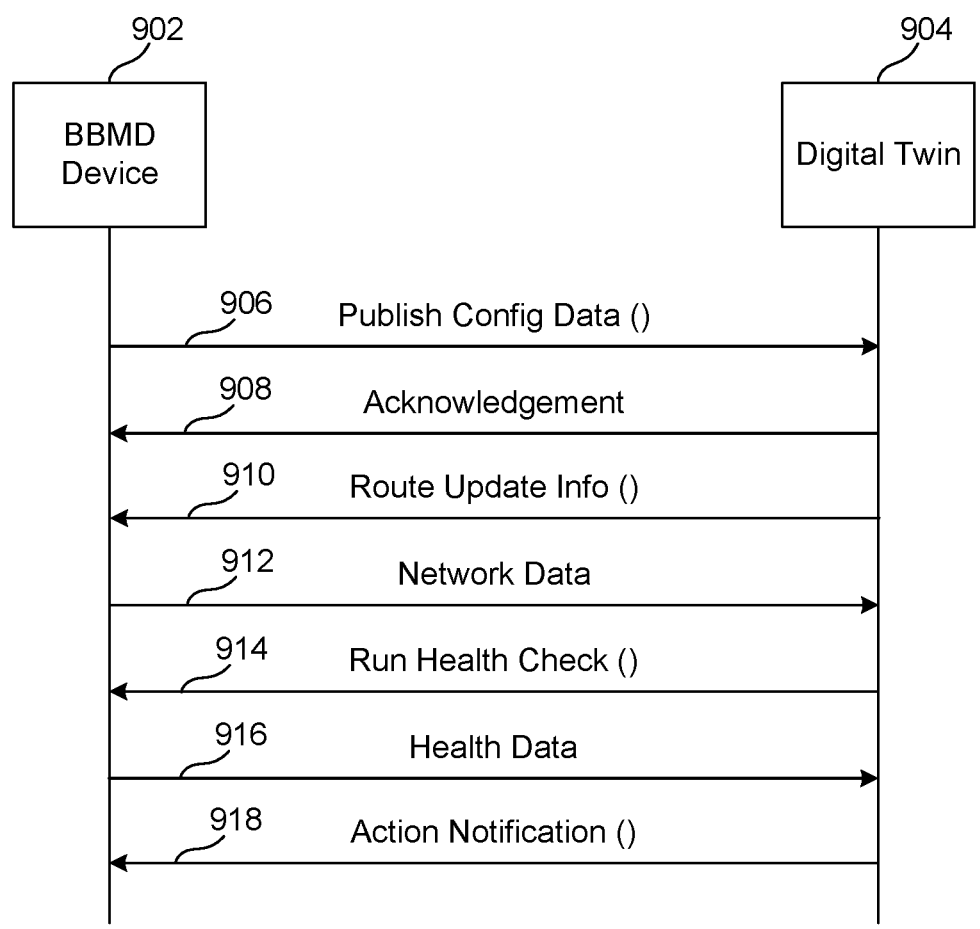
FIG. 9 is a signaling diagram of communications exchanged between a BBMD device and its digital twin, according to an exemplary embodiment.

FIG. 9 is a signaling diagram of communications exchanged between a BBMD device and its digital twin, according to some embodiments. Referring to FIG. 9, in various embodiments, a digital twin 904 of a BBMD device 902 contains a mirror image of the BBMD device's 902 BDT, FDT, and IP address. Thus, the BBMD device 902 send a Publish Config Data( ) message 906 to the digital twin 904 with any changes to its BDT, FDT, or IP address and the digital twin 904 returns an acknowledgement 908. In some embodiments, the digital twin 904 detects failure or potential fault states of the BBMD device 902 and the network. Thus, the digital twin 904 periodically injects network data or test data to gather network routing data to track network behavior. Accordingly, the digital twin 904 periodically sends a Route Update Info( ) message 910 to the BBMD device 902, and the BBMD device responds with the network data 912.

In some embodiments, if the digital twin 904 detects abnormal behavior from the network data 912, the digital twin 904 may check the BBMD device 902 to increase its prediction success rate. For example, in some embodiments, the digital twin 904 may read the memory state (e.g., RAM state) and the processor status (e.g., CPU status) of the BBMD device 902 to determine if the BBMD device 902 is experiencing a failure or potential fault state or if the network is experiencing network latency, for example. In this case, the digital twin 904 may send a Run Health Check( ) message 914 to the BBMD device 902, and the BBMD device 902 may respond with its health data 916. In some embodiments, if the digital twin 904 determines from the health data 916 that the BBMD device 902 is experiencing a failure or potential fault state, the digital twin 904 sends a warning to the operator (e.g., the system admin) for preemptive action. For example, in some embodiments, the digital twin 904 sends an Action Notification( ) message 918 to alert the operator of the failure or potential fault state.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building automation system comprising:
   a plurality of subnets;
   an active broadcast management device configured on at least one of the plurality of subnets;
   a pool of virtual devices communicably connected to the active broadcast management device, wherein virtual devices in the pool of virtual devices are configured to store a broadcast distribution table (BDT);
   one or more processors; and
   memory coupled to the one or more processors and storing instructions that, when executed by the one or more processors, cause the one or more processors to:
   transmit a health status message to available virtual devices in the pool of virtual devices;
   receive health status responses from the available virtual devices; and
   select, according to the health status responses, at least one virtual device from among the available virtual devices as a backup virtual broadcast management device to the active broadcast management device.

2. The system of claim 1, wherein the backup virtual broadcast management device is configured to sync BDT data with the active broadcast management device.

3. The system of claim 1, wherein the backup virtual broadcast management device is configured to detect failure of the active broadcast management device, and to switch over to an address of the active broadcast management device to assume an active role for the active broadcast management device in response to detecting the failure.

4. The system of claim 1, wherein the health status message is transmitted to each of the available virtual devices in response to failure of the active broadcast management device.

5. The system of claim 1, wherein the health status responses include health data from each of the available virtual devices, the health data including memory state, processor status, number of processes running, and network status.

6. The system of claim 5, wherein the health data is weighted according to site configuration requirements of the building automation system.

7. The system of claim 6, wherein the health data for each of the available virtual devices is compared to each other to select the backup virtual broadcast management device.

8. The system of claim 1, wherein the backup virtual broadcast management device is configured to periodically inject network data into at least one of the plurality of subnets to detect a network status of the plurality of subnets.

9. The system of claim 1, wherein the backup virtual broadcast management device is configured to periodically read memory state and processor status of the active broadcast management device, and to store historical values of the memory state and the processor status of the active broadcast management device.

10. The system of claim 9, wherein the backup virtual broadcast management device is configured to compare recent values of the memory state and the processor status of the active broadcast management device with the historical values to identify a potential fault state of the active broadcast management device.

11. A method for improving communication reliability between devices in a building automation system comprising a plurality of subnets, an active broadcast management device configured on at least one of the plurality of subnets, and a pool of virtual devices communicably connected to the active broadcast management device, wherein virtual devices in the pool of virtual devices configured to store a broadcast distribution table (BDT), the method comprising:
transmitting, by one or more processors, a health status message to available virtual devices in the pool of virtual devices;
receiving, by the one or more processors, health status responses from the available virtual devices; and
selecting, by the one or more processors, at least one virtual device from among the available virtual devices according to the health status responses, the at least one virtual device selected to serve as a backup virtual broadcast management device to the active broadcast management device.

12. The method of claim 11, wherein the backup virtual broadcast management device is configured to sync BDT data with the active broadcast management device.

13. The method of claim 11, wherein the backup virtual broadcast management device is configured to detect failure of the active broadcast management device, and to switch over to an address of the active broadcast management device to assume an active role for the active broadcast management device in response to detecting the failure.

14. The method of claim 11, wherein the health status message is transmitted to each of the available virtual devices in response to failure of the active broadcast management device.

15. The method of claim 11, wherein the health status responses includes health data from each of the available virtual devices, the health data including memory state, processor status, number of processes running, and network status.

16. The method of claim 15, further comprising weighing, by the one or more processors, the health data according to site configuration requirements of the building automation system.

17. The method of claim 16, further comprising comparing, by the one or more processors, the health data for each of the available virtual devices to each other to select the backup virtual broadcast management device.

18. The method of claim 11, wherein the backup virtual broadcast management device is configured to periodically inject network data into at least one of the plurality of subnets to detect a network status of the plurality of subnets.

19. The method of claim 11, wherein the backup virtual broadcast management device is configured to periodically read memory state and processor status of the active broadcast management device, and to store historical values of the memory state and the processor status of the active broadcast management device.

20. A building device of a building comprising memory coupled to one or more processors, the memory storing instructions that, when executed by the one or more processors, cause the one or more processors to:
transmit a health status message to available virtual devices in a pool of virtual devices;
receive a health status responses from the available virtual devices; and
select, according to the health status responses, at least one virtual device from among the available virtual devices as a backup virtual broadcast management device to an active broadcast management device.

* * * * *